United States Patent
Lewis

(10) Patent No.: US 6,758,066 B2
(45) Date of Patent: Jul. 6, 2004

(54) GLASSWARE FORMING MOLD AND METHOD OF MANUFACTURE

(75) Inventor: David L. Lewis, Sylvania, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 226 days.

(21) Appl. No.: 09/879,495

(22) Filed: Jun. 12, 2001

(65) Prior Publication Data

US 2002/0184923 A1 Dec. 12, 2002

(51) Int. Cl.[7] ............................ C03B 9/347; C03B 11/06
(52) U.S. Cl. ...................... 65/374.12; 249/135; 420/96; 420/97
(58) Field of Search .............................. 65/267, 374.12; 420/96, 97; 249/135

(56) References Cited

U.S. PATENT DOCUMENTS

| | | | |
|---|---|---|---|
| 3,968,302 A | 7/1976 | Brown | 428/328 |
| 4,261,745 A | 4/1981 | Watanabe | 75/208 R |
| 4,435,226 A | 3/1984 | Neuhauser et al. | |
| 4,450,019 A | 5/1984 | Satou et al. | |
| 4,484,953 A | 11/1984 | Kovacs et al. | |
| 4,572,751 A | 2/1986 | Oguri et al. | |
| 4,806,157 A | 2/1989 | Subramanian | |
| 4,830,656 A | 5/1989 | Chalon | |
| 5,030,299 A | 7/1991 | Nishimura et al. | |
| 5,049,354 A | 9/1991 | Nishimura et al. | |
| 5,173,253 A | 12/1992 | Nishimura et al. | |
| 5,964,915 A | 10/1999 | Neuman | 65/214 |
| 6,412,308 B1 * | 7/2002 | Lewis et al. | 65/267 |

FOREIGN PATENT DOCUMENTS

| | | |
|---|---|---|
| EP | 0529922 A1 | 3/1993 |
| EP | 1084994 A2 | 3/2001 |
| HU | 219390 B | 7/1997 |

OTHER PUBLICATIONS

QIT–Fer et Titane, Inc. *Ductile Iron Data For Design Engineers*, Copyright 1990.

* cited by examiner

Primary Examiner—Sean Vincent

(57) ABSTRACT

Thermal conductivity of glassware forming blank molds and blow molds of Ni-Resist ductile iron is selectively controlled by formation of compacted graphite in the mold microstructure during preparation of the melt and casting of the mold bodies. Specifically, with a Type D5 Ni-Resist ductile iron according to ASTM-A439-84, compacted graphite is selectively formed in the cast microstructure of the mold body by reducing the magnesium and sulphur concentrations in the iron composition to the range of 0.01 to 0.04 wt % magnesium and 0.00 to 0.01 wt % sulphur, and adding titanium to the iron composition in the range of 0.10 to 0.25 wt % titanium. Whereas formation of compacted graphite in the cast microstructure is normally considered to be undesirable for glassware forming molds, it has been found that formation of a small but appreciable amount of graphite provides the opportunity selectively to tailor the thermal conductivity characteristics of the mold body.

2 Claims, No Drawings

GLASSWARE FORMING MOLD AND METHOD OF MANUFACTURE

The present invention is directed to glassware forming machines, and more particularly to a glassware forming mold and method of manufacture in which the microstructure of the mold material is tailored to obtain desired heat transfer characteristics.

BACKGROUND AND OBJECTS OF THE INVENTION

The science of glass container manufacture is currently served by the so-called individual section machine. Such machines include a plurality of separate or individual manufacturing sections, each of which has a multiplicity of operating mechanisms for converting one or more charges or gobs of molten glass into hollow glass containers and transferring the containers through successive stations of the machine section. Each machine section typically includes one or more blank molds in which a glass gob is initially formed in a blowing or pressing operation, one or more invert arms for transferring the blanks to blow molds in which the containers are blown to final form, tongs for removing the formed containers onto a deadplate, and a sweepout mechanism for transferring molded containers from the deadplate onto a machine conveyor. U.S. Pat. No. 4,362,544 includes a background discussion of both blow-and-blow and press-and-blow glassware forming processes, and discloses an electropneumatic individual section machine adapted for use in either process. In the past, the blank and blow molds of a glassware forming machine have generally been cooled by directing air onto or through the mold parts. It has been proposed in U.S. Pat. Nos. 3,887,350 and 4,142,884, for example, to direct a liquid, such as water, through passages in the mold parts to improve heat extraction.

Mold material for manufacture of quality glassware must have the following characteristics: good wear properties, good thermal cycle resistance to cracking, good mechanical properties, good glass release properties, ease of machineability, ease of repair, and economic feasability. Ductile iron, which is defined as an iron in which free microstructural graphite is in the form of spheres, has been proposed for use as a mold material to manufacture glassware in which reduced thermal conductivity (as compared with gray iron for example) is desired. Specific examples of glassware, for which ductile iron is typically employed as the mold material, are containers that require only a small amount of heat removal in the mold equipment, such as cosmetic and pharmaceutical bottles. However, ductile iron has not been employed in manufacture of molds for larger containers, such as beer bottles, because of its reduced heat transfer and thermal cycle resistance properties. Ni-Resist ductile iron has been proposed for glassware manufacture. The increased nickel content of Ni-Resist ductile iron contributes to improved glass release properties. However, standard austenitic Ni-Resist ductile iron does not exhibit desired thermal conductivity and resistance to thermal cyclic cracking.

Copending application Ser. No. 09/400,123, filed Sep. 2, 1999 and assigned to the assignee hereof, discloses that the mold body or bodies (either blank mold or blow mold) for an individual section glassware forming machine may be constructed of austenitic Ni-Resist ductile iron. Such ductile iron is preferably a Type D Ni-Resist ductile iron in accordance with ASTM-A439-84, but modified to possess increased silicon and molybdenum contents. Type D2-C iron is a disclosed example. Silicon content is preferably in excess of 3.0 wt %, and most preferably is 4.20±0.20 wt %. Molybdenum content is preferably in excess of 0.5 wt %, and most preferably 0.70±0.10 wt %. The increased silicon content decreases the thermal conductivity of the mold material. The increased molybdenum content improves thermal cyclic resistance to cracking. The increased nickel content characteristic to Ni-Resist materials improves glass release properties. The austenitic Ni-Resist ductile iron composition of that application also yields desirable wear and other mechanical properties, ease of machineability and repair, and desirable economic feasability. Austenitic Ni-Resist material also provides a more stable microstructure than gray iron, for example, up to a temperature of 1400 F.

According to current technology, the blank molds and the blow molds of an individual section glassware forming machine are designed entirely separately from each other to obtain the most desirable thermal and other properties under the differing conditions in which the molds operate. A general object of the present invention is to provide a general material that can be used for both the blank molds and the blow molds of an individual section glassware forming machine, with the heat transfer properties of the molds being tailored at the time of manufacture by selectively tailoring the metal composition prior to casting the mold bodies.

SUMMARY OF THE INVENTION

Thermal conductivity of glassware forming blank and blow molds of Ni-Resist iron is selectively controlled by formation of compacted graphite in the mold microstructure during preparation of the melt and casting of the mold bodies. Specifically, with a Type D5 Ni-Resist iron according to ASTM-A439-84, compacted graphite is selectively formed in the cast microstructure of the mold body by controlling the magnesium and sulphur concentrations in the iron composition to the range of 0.01 to 0.04 wt % magnesium and 0.00 to 0.01 wt % sulphur, and adding titanium to the iron composition in the range of 0.10 to 0.25 wt % titanium. Whereas formation of compacted graphite in a cast ductile microstructure is normally considered to be undesirable for glass container forming molds, it has been found that formation of a small but appreciable amount of graphite provides the opportunity selectively to tailor the thermal conductivity characteristics of the mold body.

A mold for a glassware forming machine in accordance with one presently preferred embodiment of the invention comprises an austenitic Ni-Resist compacted graphite ductile iron having a magnesium content in the range of 0.01 to 0.04 wt %, a sulphur content in the amount of 0.00 to 0.01 wt %, and a titanium content in the range of 0.01 to 0.25 wt %. In the preferred embodiment of the invention, the austenitic (Type D5) Ni-Resist compacted graphite iron has an appreciable or measurable amount of compacted graphite of 40 wt % or more, which is to say that at least 40% of the graphite is in compacted rather than nodular form. The preferred embodiment of the invention consists essentially of carbon in the amount of 1.50 to 2.40 wt %, silicon in the amount of 1.00 to 2.80 wt %, manganese in the amount of 0.50 to 1.00 wt %, phosphorus in the amount of 0.00 to 0.80 wt %, nickel in the amount of 34.0 to 36.0 wt %, chromium in the amount of 0.00 to 0.10 wt %, molybdenum in the amount of 0.00 to 0.80 wt %, magnesium in the amount of 0.01 to 0.04 wt %, sulphur in the amount of 0.00 to 0.01 wt %, titanium in the amount of 0.01 to 0.25 wt %, and balance iron.

A method of making a mold for a glassware forming machine in accordance with a presently preferred embodiment of the invention comprises the steps of casting the mold of an austenitic Type D5 Ni-Resist ductile iron according to ASTM-A439-84, while selectively controlling thermal conductivity of the mold by selectively controlling magnesium content of the mold in the range of 0.01 to 0.04 wt %, sulphur content in the range 0.00 to 0.01 wt % and titanium content in the range of 0.01 to 0.25 wt %. Selective tailoring of the heat transfer characteristics of the mold material during the mold forming process allows implementation of the same basic material for both blank molds and blow molds, while providing opportunity for selectively tailoring the heat transfer characteristics of each mold type according to the specific requirements during use.

DETAILED DESCRIPTION OF THE PREFERRED EMBODIMENT

The disclosure of above-noted U.S. application Ser. No. 09/400,123, filed Sep. 2, 1999 and assigned to the assignee hereof, is incorporated herein by reference.

Mold bodies for a glassware forming machine (either blank mold or blow mold bodies) are constructed of austenitic Ni-Resist ductile iron in accordance with the presently preferred embodiments of the invention. Ni-Resist ductile iron is a ductile iron that has a high nickel content. Type D5 Ni-Resist cast ductile iron according to ASTM-A439-84 has the following composition: 1.50 to 2.40 wt % carbon, 1.00 to 2.80 wt % silicon, 0.05 to 1.00 wt % manganese, 0.00 to 0.80 wt % phosphorus, 34.0 to 36.0 wt % nickel, 0.00 to 0.10 wt % chromium, 0.00 to 0.80 wt % molybdenum, about 0.03 to 0.06 wt % manganese, about 0.01 wt % sulphur, and balance iron. In accordance with the present invention, the magnesium and sulphur concentrations in the melt or "heat" prior to casting are reduced to the range of 0.01 to 0.04 wt % magnesium and 0.00 to 0.01 wt % sulphur, and titanium is added to the melt or "heat" in an amount to yield a titanium concentration in the range of 0.10 to 0.25 wt % titanium. Reduction in the magnesium concentration increases the tendency of the graphite structure to be compacted rather than nodular. Likewise, reduction in sulfur enhances the formation of compacted graphite. Addition of titanium increases the tendency of the graphite to assume compacted rather than nodular form and aids in the formation of compacted graphite. All three elements must be controlled to ensure repeatability of the microstructure.

Thus, the composition of the mold bodies in accordance with the present invention is: 1.50 to 2.40 wt % carbon, 1.00 to 2.80 wt % silicon, 0.05 to 1.00 wt % manganese, 0.00 to 0.08 wt % phosphorus, 34.0 to 36.0 wt % nickel, 0.00 to 0.10 wt % chromium, 0.00 to 0.80 wt % molybdenum, 0.01 to 0.04 wt % magnesium, 0.00 to 0.01 wt % sulphur, 0.01 to 0.25 wt % titanium, and balance iron. Reduction of the concentrations of magnesium and sulphur, and addition of titanium, produce compacted graphite in the microstructure of the mold bodies. The concentration of compacted graphite in the mold microstructure is selectively controllable by controlling the magnesium, sulphur and titanium concentrations in the melt or "heat" prior to casting. Thus, the same basic melt can be used for producing either blank or blow molds, with the heat transfer characteristics being tailored for either blank or blow mold implementation by selectively controlling the concentrations of magnesium, sulphur and titanium.

There have thus been disclosed a mold and method of mold manufacture that fully satisfy all of the objects and aims previously set forth. In particular, simultaneous selective reduction of magnesium and sulphur concentrations, and addition of titanium, in an austenitic Ni-Resist ductile iron provides for selective control of heat transfer characteristics of the mold body by selective formation of compacted graphite in the cast microstructure of the mold. Thus, the same basic Ni-Resist cast ductile iron composition can be used for either blank or blow molds, with the heat transfer characteristics being tailored by selective control of these minor constituents. Modifications and variations to the mold and method of manufacture will readily suggest themselves to persons of ordinary skill in the art. The invention is intended to embrace all such modifications and variations as fall within the spirit and broad scope of the appended claims.

What is claimed is:

1. A mold for a glassware forming machine that is of austenitic Ni-Resist ductile iron with a microstructure having an appreciable amount of compacted graphite and consists essentially of carbon in the amount of 1.50 to 2.40 wt %, silicon in the amount of 1.00 to 2.80 wt %, manganese in the amount of 0.05 to 1.00 wt %, phosphorus in the amount of 0.00 to 0.08 wt %, nickel in the amount of 34.0 to 36.0 wt %, chromium in the amount of 0.00 to 0.10 wt %, molybdenum in the amount of 0.00 to 0.80 wt %, magnesium in the amount of 0.01 to 0.04 wt %, sulphur in the amount of 0.00 to 0.01 wt %, titanium in the amount of 0.01 to 0.25 wt %, and balance iron.

2. The mold set forth in claim 1 wherein at least 40% of the graphite in said microstructure is compacted graphite.

* * * * *

UNITED STATES PATENT AND TRADEMARK OFFICE
CERTIFICATE OF CORRECTION

PATENT NO. : 6,758,066 B2  Page 1 of 1
APPLICATION NO. : 09/879495
DATED : July 6, 2004
INVENTOR(S) : David L. Lewis It is certified that error appears in the above-identified patent and that said Letters Patent is hereby corrected as shown below:

Column 2, line 61 delete [0.80] and insert therein --0.080--

Column 3, line 30 delete [0.80] and insert therein --0.080--

Signed and Sealed this

Eighth Day of July, 2008

JON W. DUDAS
*Director of the United States Patent and Trademark Office*